US007974840B2

(12) United States Patent
Kim et al.

(10) Patent No.: US 7,974,840 B2
(45) Date of Patent: Jul. 5, 2011

(54) METHOD AND APPARATUS FOR ENCODING/DECODING MPEG-4 BSAC AUDIO BITSTREAM HAVING ANCILLARY INFORMATION

(75) Inventors: Junghoe Kim, Seoul (KR); Shihwa Lee, Seoul (KR); Sangwook Kim, Seoul (KR); Eunmi Oh, Seoul (KR); Dohyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 935 days.

(21) Appl. No.: 10/996,062

(22) Filed: Nov. 24, 2004

(65) Prior Publication Data

US 2005/0129109 A1 Jun. 16, 2005

(30) Foreign Application Priority Data

Nov. 26, 2003 (KR) ........................ 10-2003-0084731

(51) Int. Cl.

| | |
|---|---|
| ***G10L 11/00*** | (2006.01) |
| ***G10L 15/00*** | (2006.01) |
| ***G10L 19/00*** | (2006.01) |
| ***G10L 21/00*** | (2006.01) |
| ***G10L 21/02*** | (2006.01) |
| ***G10L 19/02*** | (2006.01) |

(52) U.S. Cl. ..................... 704/229; 704/200; 704/200.1; 704/201; 704/227

(58) Field of Classification Search ............... 704/200.1, 704/200, 201, 227, 229
See application file for complete search history.

(56) References Cited

U.S. PATENT DOCUMENTS

| | | | | | |
|---|---|---|---|---|---|
| 4,896,362 | A | * | 1/1990 | Veldhuis et al. | 704/200.1 |
| 4,949,299 | A | * | 8/1990 | Pickett | 710/105 |
| 5,434,913 | A | * | 7/1995 | Tung et al. | 379/202.01 |
| 5,455,684 | A | * | 10/1995 | Fujinami et al. | 386/356 |
| 5,533,052 | A | * | 7/1996 | Bhaskar | 375/244 |
| 5,583,962 | A | * | 12/1996 | Davis et al. | 704/229 |
| 5,623,577 | A | * | 4/1997 | Fielder | 704/200.1 |

(Continued)

FOREIGN PATENT DOCUMENTS

CN 1218339 6/1999

(Continued)

OTHER PUBLICATIONS

European Search Report dated Mar. 31, 2005 and Abstract of Application No. 04257267.7-1224.

(Continued)

*Primary Examiner* — E. Yen
(74) *Attorney, Agent, or Firm* — Staas & Halsey LLP

(57) ABSTRACT

A method of and an apparatus for encoding/decoding an MPEG-4 bit sliced arithmetic coding (BSAC) audio bitstream having ancillary information. A time domain audio signal is converted to a frequency domain audio signal and quantized. A number of data bits is counted and a number of available bits per layer is obtained. The number of available bits per layer is modified considering the size of ancillary information. Actual audio data is encoded in units of layers and ancillary information is embedded in the encoded bitstream. A header is decoded and a layer structure of an audio bitstream is calculated to determine the size of the ancillary information as a difference between a size of data up to a top layer and a size of a frame. The ancillary information is extracted to improve meta data and sound quality of audio contents.

17 Claims, 10 Drawing Sheets

U.S. PATENT DOCUMENTS

| | | | | | |
|---|---|---|---|---|---|
| 5,633,981 | A | * | 5/1997 | Davis | 704/230 |
| 5,649,029 | A | * | 7/1997 | Galbi | 382/233 |
| 5,657,423 | A | * | 8/1997 | Benbassat et al. | 704/230 |
| 5,675,703 | A | * | 10/1997 | Sato | 704/230 |
| 5,694,332 | A | * | 12/1997 | Maturi | 700/94 |
| 5,694,522 | A | * | 12/1997 | Hiratsuka et al. | 704/265 |
| 5,732,391 | A | * | 3/1998 | Fiocca | 704/229 |
| 5,761,636 | A | * | 6/1998 | Bolton et al. | 704/229 |
| 5,764,698 | A | * | 6/1998 | Sudharsanan et al. | 375/241 |
| 5,794,181 | A | * | 8/1998 | Benbassat et al. | 704/212 |
| 5,838,791 | A | * | 11/1998 | Torii et al. | 380/217 |
| 5,845,239 | A | * | 12/1998 | Laczko et al. | 704/200 |
| 5,848,391 | A | * | 12/1998 | Bosi et al. | 704/200.1 |
| 5,886,965 | A | | 3/1999 | Tozaki et al. | |
| 5,893,066 | A | * | 4/1999 | Hong | 704/500 |
| 5,945,239 | A | * | 8/1999 | Taniguchi | 430/30 |
| 5,969,764 | A | * | 10/1999 | Sun et al. | 375/240.06 |
| 5,978,762 | A | * | 11/1999 | Smyth et al. | 704/229 |
| 5,986,200 | A | | 11/1999 | Curtin | |
| 6,041,295 | A | * | 3/2000 | Hinderks | 704/206 |
| 6,061,655 | A | * | 5/2000 | Xue et al. | 704/500 |
| 6,061,820 | A | * | 5/2000 | Nakakita et al. | 714/751 |
| 6,098,044 | A | * | 8/2000 | Huang | 704/500 |
| 6,119,091 | A | * | 9/2000 | Huang et al. | 704/500 |
| 6,122,618 | A | * | 9/2000 | Park | 704/500 |
| 6,125,398 | A | * | 9/2000 | Mirashrafi et al. | 709/236 |
| 6,138,051 | A | * | 10/2000 | Dieterich | 700/94 |
| 6,208,276 | B1 | * | 3/2001 | Snyder | 341/123 |
| 6,339,760 | B1 | * | 1/2002 | Koda et al. | 704/278 |
| 6,349,284 | B1 | * | 2/2002 | Park et al. | 704/500 |
| 6,865,188 | B1 | * | 3/2005 | Stirling et al. | 370/460 |
| 6,879,652 | B1 | * | 4/2005 | Srinivasan | 375/377 |
| 6,950,794 | B1 | * | 9/2005 | Subramaniam et al. | 704/200.1 |
| 7,050,980 | B2 | * | 5/2006 | Wang et al. | 704/503 |
| 7,146,312 | B1 | * | 12/2006 | Demetrescu et al. | 704/229 |
| 7,334,176 | B2 | * | 2/2008 | Schroder | 714/750 |
| 7,343,287 | B2 | * | 3/2008 | Geiger et al. | 704/229 |
| 7,395,346 | B2 | * | 7/2008 | Pinder et al. | 709/232 |
| 2001/0005173 | A1 | * | 6/2001 | Snyder | 341/123 |
| 2002/0165720 | A1 | * | 11/2002 | Johnson et al. | 704/500 |
| 2002/0188841 | A1 | * | 12/2002 | Jones et al. | 713/153 |
| 2004/0181817 | A1 | * | 9/2004 | Larner | 725/143 |
| 2005/0091051 | A1 | * | 4/2005 | Moriya et al. | 704/229 |

FOREIGN PATENT DOCUMENTS

| | | | |
|---|---|---|---|
| FR | 2 773 653 | | 7/1999 |
| GB | 2 354 857 | A | 4/2001 |
| JP | 07-253796 | | 10/1995 |
| JP | 10-233692 | | 9/1998 |
| JP | 11-317672 | | 11/1999 |
| JP | 11-339396 | | 12/1999 |
| JP | 2000-175155 | | 6/2000 |
| JP | 2001-242899 | | 9/2001 |
| JP | 2002-100994 | | 4/2002 |
| JP | 2002-300504 | | 10/2002 |
| JP | 2002-341900 | | 11/2002 |

OTHER PUBLICATIONS

Chinese Office Action dated Oct. 10, 2008, issued in corresponding Chinese Patent Application No. 200410103796.

Japanese Office Action dated Aug. 3, 2010, issued in Japanese Patent Application No. 2004-341556 with partial English translation.

* cited by examiner

FIG. 12

| Syntax | No. of bits | Mnemonic |
|---|---|---|
| bsac_ header() | | |
| { | | |
| **header_length;** | **4** | **uimbf** |
| **sba_mode;** | **1** | **uimbf** |
| **top_layer;** | **6** | **uimbf** |
| **base_snf_thr;** | **2** | **uimbf** |
| | | |
| for(ch=0;ch<nch;ch++) | | |
| **max_scalefactor[ch];** | **8** | **uimbf** |
| | | |
| **base_band;** | **5** | **uimbf** |
| | | |
| for(ch=0;ch<nch;ch++) { | | |
| **cband_si_type[ch];** | **5** | **uimbf** |
| | | |
| **base_scf_model[ch];** | **3** | **uimbf** |
| **enh_scf_model[ch];** | **3** | **uimbf** |
| **max_sfb_si_len[ch];** | **4** | **uimbf** |
| } | | |
| } | | |

FIG. 13

| Syntax | No. of bits | Mnemonic |
|---|---|---|
| general_header () | | |
| { | | |
| **reserved_bit;** | **1** | **bslbf** |
| **window_sequence;** | **2** | **uimsbf** |
| **window_shape;** | **1** | **uimsbf** |
| if( window_sequence == EIGHT_SHORT_SEQUENCE ) { | | |
| **max_sfb;** | **4** | **uimsbf** |
| **scale_factor_grouping;** | **7** | **uimsbf** |
| } else { | | |
| **max_sfb;** | **6** | **uimsbf** |
| } | | |
| **pns_data_present;** | **1** | **uimbf** |
| if (pns_data_present) | | |
| **pns_start_sfb;** | **6** | **uimbf** |
| if( nch == 2 ) | | |
| **ms_mask_present;** | **2** | **bslbf** |
| for( ch=0 ch< nch; ch++) { | | |
| **tns_data_present[ch];** | **1** | **bslbf** |
| if( tns_data_present[ch] ) | | |
| tns_data(); | | |
| **ltp_data_present[ch];** | **1** | **bslbf** |
| if( ltp_data_present[ch] ) | | |
| ltp_data(last_max_sfb, max_sfb); | | |
| } | | |
| } | | |

METHOD AND APPARATUS FOR ENCODING/DECODING MPEG-4 BSAC AUDIO BITSTREAM HAVING ANCILLARY INFORMATION

CROSS-REFERENCE TO RELATED APPLICATIONS

This application claims the priority of Korean Patent Application No. 2003-84731, filed on Nov. 26, 2003, in the Korean Intellectual Property Office, the disclosure of which is incorporated herein by reference.

BACKGROUND OF THE INVENTION

1. Field of the Invention

The present invention relates to MPEG audio bitstream encoding/decoding, and more particularly, to a method of and an apparatus for encoding/decoding an MPEG-4 bit sliced arithmetic coding (BSAC) audio bitstream having ancillary information.

2. Description of the Related Art

An analog waveform is a continuous-time signal. Therefore, analog-to-digital (A/D) conversion is necessary to represent the analog waveform as a discrete-time signal. Two processes are necessary for the A/D conversion. One is a sampling process for converting a temporally continuous-time signal into a discrete-time signal, and the other is an amplitude quantization process for limiting the number of possible amplitudes using a finite value. That is, the amplitude quantization process converts an input amplitude x(n) at a time n to y(n), which is an element of a finite set of possible amplitudes.

In an audio signal storing/restoring method, according to recent development of digital signal processing technologies, a technology of sampling and quantizing a typical analog signal, converting the sampled and quantized signal to pulse code modulation (PCM) data, which is a digital signal, storing the PCM data in a recording/storing medium such as a compact disc (CD) or a digital audio tape (DAT), and listening to the PCM data by reproducing the stored data according to a user demand has been developed. By applying the storing/restoring method using a digital method, better sound quality may be obtained and deterioration due to a stored duration may be prevented as compared with tape recording using an analog method such as a long-play record (LP). However, since a size of digital data is great, problems occur when storing or transmitting is performed.

To solve the storage and transmission problems, efforts to reduce data amount using a differential pulse code modulation (DPCM) method or an adaptive differential pulse code modulation (ADPCM) method, which compresses a digital voice signal, are being made. However, efficiency in the DPCM or ADPCM method is largely different according to the kinds of signals. Recently, in Moving Picture Expert Group (MPEG)/audio technologies for which standardization works have been achieved by International Standard Organization (ISO) or AC-2/AC-3 technologies developed by DOLBY CO. LTD., a method of reducing data amount by using a psychoacoustic model has been used. The method of reducing the data amount has largely contributed to efficiently reducing data amount regardless of signal characteristics.

In a conventional audio compression technology such as MPEG-1/audio, MPEG-2/audio, or AC-2/AC-3, signals in the time domain are bound in blocks having a predetermined size and converted to signals in the frequency domain. The converted signals are scalar quantized using a psychoacoustic model. The quantizing technology is simple but not optimum even if an input sample is statistically independent. Furthermore, if the input sample is statistically dependent, the quantizing technology is inefficient. Due to this problem, encoding is performed by including lossless encoding, such as entropy encoding, or a certain kind of adaptive quantization. Therefore, a more complicated process than storing simple PCM data is performed, and a bitstream is composed of quantized PCM data and ancillary information for signal compression.

The MPEG/audio standard or AC-2/AC-3 method provides sound quality equivalent to the sound quality of a CD with a 64 Kbps-384 Kbps rate, which is a 1/6 to 1/8 of a conventional digital encoding rate. With high sound quality, the MPEG/audio standard will play an important role for an audio signal storing and transmitting system such as digital audio broadcasting (DAB), an internet phone, audio on demand (AOD), or a multimedia system.

In conventional methods, since a fixed bitrate is provided in an encoder and a quantizing and encoding process is performed by finding an optimal status for the provided bitrate, when a fixed bitrate is used for encoding, the methods provide a good scheme. However, for multimedia purposes, there is a need for conventional low bitrate encoding and encoders/decoders having various functions. One of these is an audio encoder/decoder capable of controlling a bitrate. The bitrate controllable audio encoder can make a low bitrate bitstream using a bitstream encoded with a high bitrate and restore the bitstream using only a partial bitstream. Accordingly, when a network is overloaded, when a performance of a decoder is not good, or when a bitrate is lowered by a user's demand, the bitrate controllable audio encoder should restore an audio signal with a reasonable performance using a partial bitstream even though the performance is deteriorated by the lowered bitrate.

A syntax allowing ancillary information to be stored, such as data_stream_element( ) and fill_element( ), is in the MPEG-2/4 AAC (ISO/IEC 13818-7, ISO/IEC 14496-3). Also, "ancillary data" is defined in the MPEG-1 layer-III (mp3). Accordingly, audio ancillary information may be stored by embedding the ancillary information in the middle of frame information. ID3v1 is a representative example in this respect. FIG. 11 shows a bitstream structure of ID3v1.

However, a syntax allowing ancillary information to be provided is not defined in a currently standardized MPEG-4 bit sliced arithmetic coding (BSAC) audio format. FIGS. 12 and 13 show a definition of a frame header of a BSAC syntax. In the BSAC, since a syntax allowing ancillary information to be embedded is not defined in a frame header, according to the standard, it is impossible to embed the ancillary information in the frame header.

SUMMARY OF THE INVENTION

The present invention provides a method of and an apparatus for encoding/decoding an MPEG-4 bit sliced arithmetic coding (BSAC) audio bitstream having ancillary data, which provides a distinctive service by improving meta data or sound quality of audio contents by embedding ancillary information in a currently standardized MPEG-4 BSAC audio format.

The present invention also provides a method of discriminating whether ancillary information is embedded in audio data encoded with an MPEG-4 BSAC audio format.

According to an aspect of the present invention, there is provided a method of encoding an MPEG-4 BSAC audio bitstream having ancillary information, the method comprising: converting a time domain audio signal to a frequency domain audio signal and quantizing the audio signal using a psychoacoustic model; counting a number of bits of bitrate controlled audio data; obtaining a number of available bits per layer using a number of bits to be used and a number of layers to be used; modifying the number of available bits per layer by obtaining a size of the ancillary information; encoding actual audio data in units of layers; and embedding the ancillary information in the encoded bitstream.

The ancillary information may be information related to sound quality improvement. The ancillary information may also be information related to music tunes.

According to another aspect of the present invention, there is provided an apparatus for encoding an MPEG-4 BSAC audio bitstream having ancillary information, the apparatus comprising: a quantization processor converting a time domain audio signal in to a frequency domain audio signal and quantizing the audio signal using a psychoacoustic model; an available bit calculator obtaining a number of available bits per layer using a number of bits and a number of layers of audio data; an available bit modifier modifying the number of available bits per layer calculated by the available bit calculator by obtaining a size of the ancillary information; and a bit packing unit encoding actual audio data according to the number of available bits per layer modified by the available bit modifier and embedding the ancillary information in the encoded bitstream.

The available bit calculator may comprise: a bit counter counting a number of bits of bitrate controlled audio data; and a by-layer available bit calculator obtaining the number of available bits per layer using the number of bits counted by the bit counter and a predetermined number of layers.

According to another aspect of the present invention, there is provided a method of decoding an MPEG-4 BSAC audio bitstream having ancillary information, the method comprising: decoding a header of an audio bitstream; calculating a layer structure of the audio bitstream by obtaining a size of a frame from header information; obtaining a size of data up to a top layer and the size of the frame from the layer structure and determining a difference between the size of data up to the top layer and the size of the frame as the size of ancillary information; extracting the ancillary information from the audio bitstream according to the size of the ancillary information; and decoding the audio bitstream up to the top layer according to the calculated layer structure.

According to another aspect of the present invention, there is provided a method of decoding an MPEG-4 BSAC audio bitstream having ancillary information, the method comprising: decoding a header of a bitstream; calculating a layer structure of the bitstream by obtaining a size of a frame from the header information; decoding audio data corresponding to a size of audio data up to a top layer from the layer structure of the bitstream; and extracting the remaining bitstream as ancillary information and decoding the ancillary information.

The extracted ancillary information may be information related to sound quality improvement. The extracted ancillary information may also be meta data of audio for an audio data user.

According to another aspect of the present invention, there is provided a method of discriminating whether ancillary information is embedded in audio data encoded with an MPEG-4 BSAC audio data, the method comprising: decoding a header of a bitstream; calculating a layer structure of the bitstream by obtaining a size of a frame from header information; and obtaining a size of data up to a top layer and the size of the frame from the layer structure and discriminating whether the ancillary information exists using a difference between the size of the data up to the top layer and the size of the frame.

According to another aspect of the present invention, there is provided an apparatus for decoding an MPEG-4 BSAC audio bitstream having ancillary information, the apparatus comprising: a bit unpacking unit decoding a header of an audio bitstream; a layer structure calculator calculating a layer structure of the audio bitstream by obtaining the size of a frame from the header information; an ancillary information calculator obtaining a size of data up to a top layer and a size of a frame from the layer structure and determining a difference between the size of the data up to the top layer and the size of the frame as the size of ancillary information; an ancillary information extractor extracting the ancillary information from the audio bitstream according to the size of the ancillary information; and an audio decoder decoding the audio bitstream up to the top layer according to the calculated layer structure.

According to another aspect of the present invention, there is provided a computer readable medium having recorded thereon a computer readable program for performing the methods described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 12 shows bsac_header( ) of an MPEG-4 BSAC syntax; and

FIG. 13 shows general_header( ) of an MPEG-4 BSAC syntax.

DETAILED DESCRIPTION OF THE PREFERRED EMBODIMENTS

Figure 1:
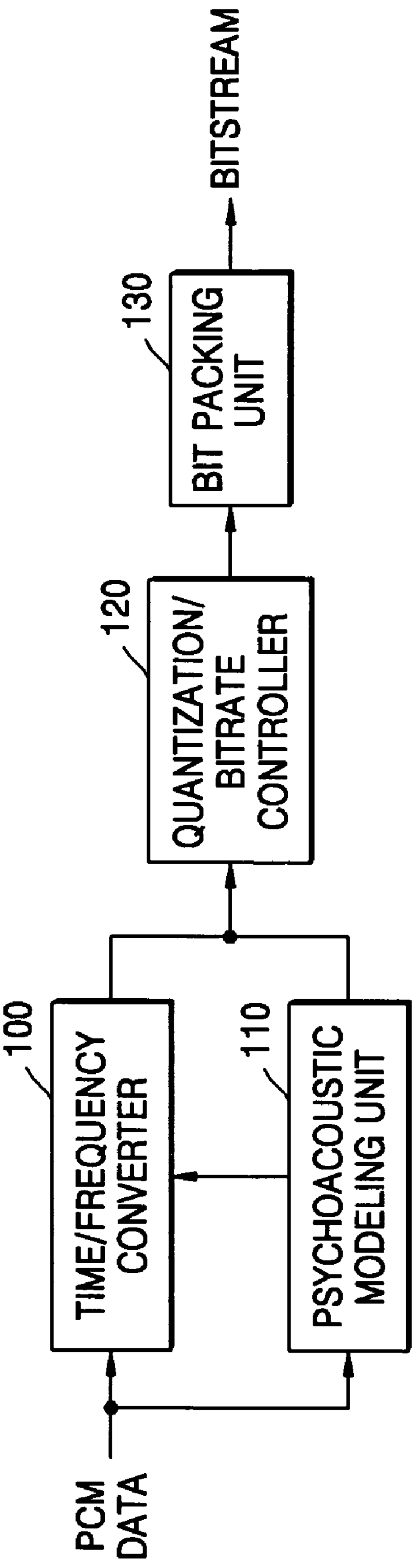
FIG. 1 is a block diagram of an apparatus for encoding an MPEG-4 BSAC audio bitstream.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus for encoding an MPEG-4 BSAC audio bitstream. Referring to FIG. 1, the apparatus comprises a time/frequency converter 100, a psychoacoustic modeling unit 110, a quantization/bitrate controller 120, and a bit packing unit 130.

The time/frequency converter 100 converts input time domain audio signals to frequency domain signals. In the time domain, differences of signal characteristics that are recognizable are not so great. However, in the frequency domain, since a difference between a signal that is recognizable and a signal that is not recognizable in each frequency band according to a psychoacoustic model is so great that quantized bits may be differently allocated according to the frequency band, compression efficiency may be improved.

The psychoacoustic modeling unit 110 binds the input audio signals converted to frequency components by the time/frequency converter 100 in units of predetermined subband signals and calculates a masking threshold value of each subband using masking effects generated due to correlations between the subband signals.

The quantization/bitrate controller 120 quantizes the subband signals in predetermined encoding subbands so that a magnitude of quantization noise of each subband becomes smaller than the masking threshold value. That is, scalar quantization is used for frequency signals of subbands so that the level of the quantization noise of each subband is smaller than the masking threshold value in order to suppress the quantization noise. The quantization is performed so that noise-to-mask ratio (NMR) values of all subbands become equal to or less than 0 dB using the NMR, which is a ratio of noise generated in each subband to the masking threshold value calculated by the psychoacoustic modeling unit 110. The fact that the NMR value is less than 0 dB indicates that the masking threshold value is greater than the quantization noise, that is, the quantization noise is not audible.

The bit packing unit 130 encodes quantized data corresponding to a base layer having the lowest bitrate, and if the encoding of the base layer is finished, the bit packing unit 130 encodes quantized data corresponding to one step higher layer, and likewise, by performing the encoding for all layers, the bit packing unit 130 builds a bitstream. In the encoding of the quantized data in each layer performed by the bit packing unit 130, the quantized data is divided into units of bits by expressing the quantized data of each layer with binary data composed of a predetermined same number of bits, and the encoding is performed from the top bit sequence composed of most significant bits from the divided bits to the base bit sequence in order.

Figure 2:
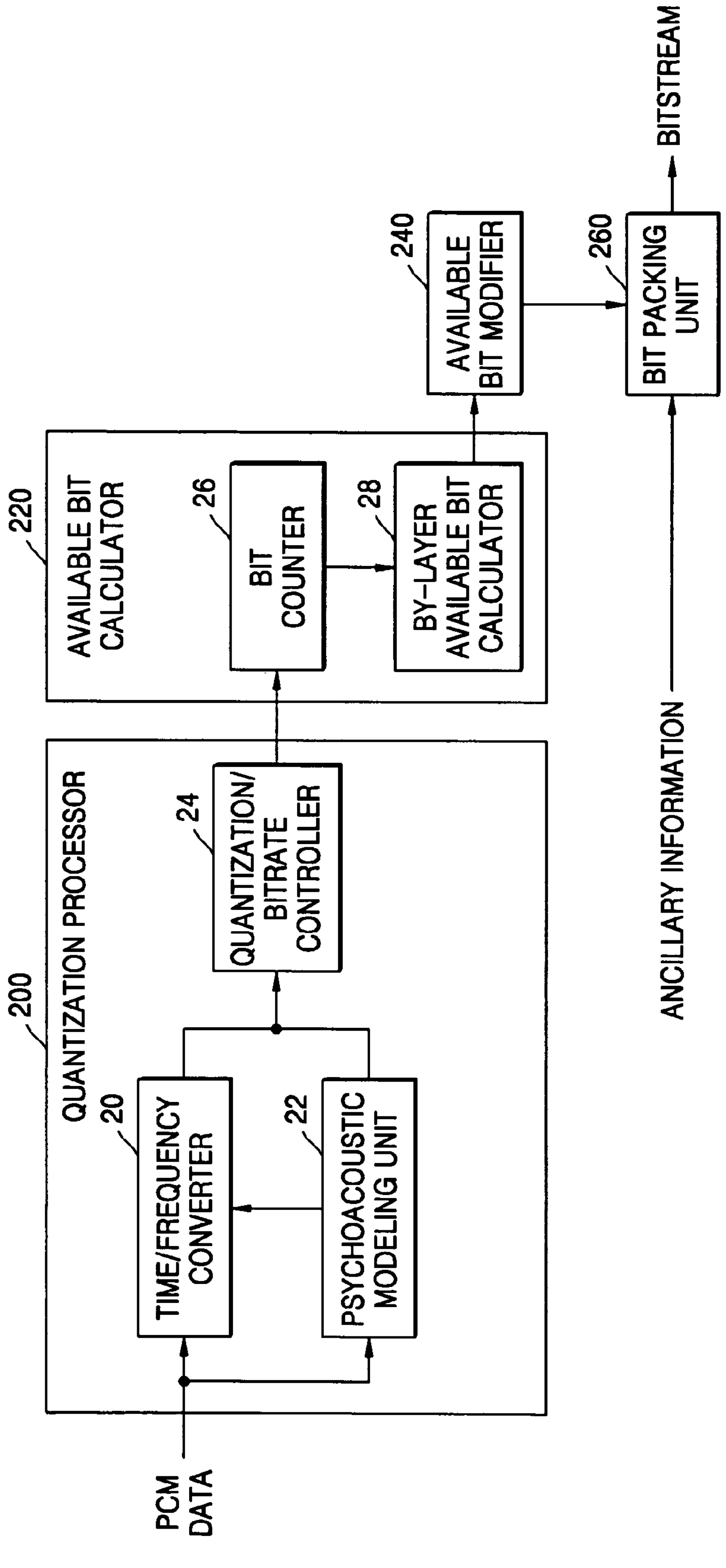
FIG. 2 is a block diagram of an apparatus for encoding an MPEG-4 BSAC audio bitstream having ancillary information according to an embodiment of the present invention.

FIG. 2 is a block diagram of an apparatus for encoding an MPEG-4 BSAC audio bitstream having ancillary information according to an embodiment of the present invention. Referring to FIG. 2, the apparatus comprises a quantization processor 200, an available bit calculator 220, an available bit modifier 240, and a bit packing unit 260.

The quantization processor 200 converts a time domain audio signal to a frequency domain audio signal, quantizes the frequency domain audio signal using a psychoacoustic model. The quantization processor 200 further comprises a time/frequency converter 20, a psychoacoustic modeling unit 22, and a quantization/bitrate controller 24. The time/frequency converter 20, the psychoacoustic modeling unit 22, and the quantization/bitrate controller 24 correspond to the time/frequency converter 100, the psychoacoustic modeling unit 110, and the quantization/bitrate controller 120 described with respect to FIG. 1 above and perform the same functions, respectively.

The available bit calculator 220 obtains a number of available bits per layer using a number of bits and a number of layers of the quantized audio data and further comprises a bit counter 26 and a by-layer available bit calculator 28. The bit counter 26 counts a number of bits of bitrate controlled audio data. The by-layer available bit calculator 28 obtains the number of available bits per layer using the number of bits of the audio data counted by the bit counter 26 and a predetermined number of layers.

The available bit modifier 240 modifies the number of available bits per layer calculated by the available bit calculator 220 by obtaining a size of the ancillary information to be embedded.

The bit packing unit 260 encodes actual audio data in units of layers according to the number of available bits per layer modified by the available bit modifier 240 and embeds ancillary information in the bitstream encoded without violating an MPEG-4 BSAC syntax.

Figure 3:
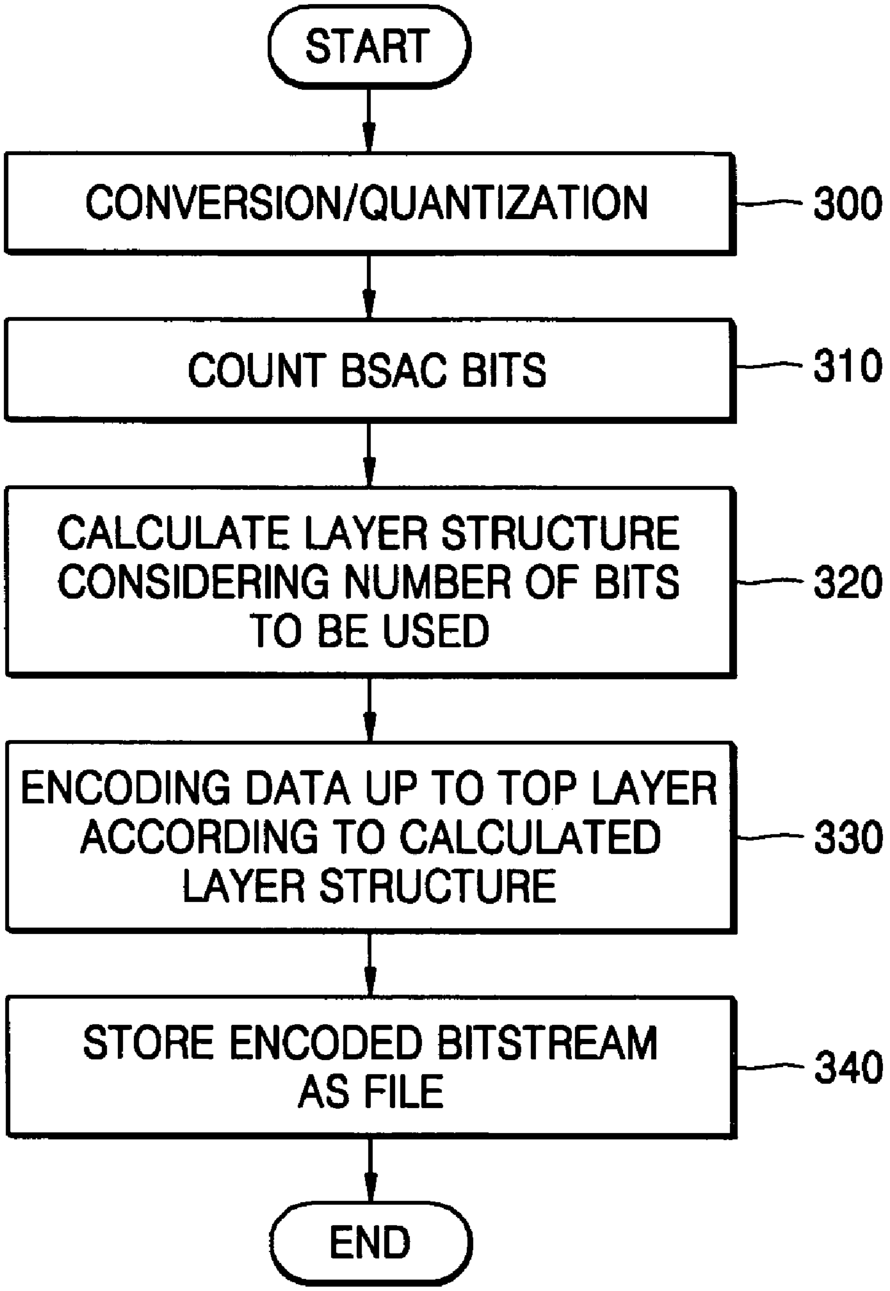
FIG. 3 is a flowchart of operations for encoding an MPEG-4 BSAC audio bitstream.

FIG. 3 is a flowchart of an operation of an apparatus for encoding an MPEG-4 BSAC audio bitstream.

Referring to FIGS. 2 and 3, an input audio signal is encoded, converted to a bitstream, and stored as a file. First, input audio signals are converted to signals in the frequency domain using a modified discrete cosine transformer (MDCT) or a subband filter by the time/frequency converter 100. The psychoacoustic modeling unit 110 binds the frequency signals in units of predetermined subbands and calculates a masking threshold value. Here, the used subband is called a quantization band since it is mainly used for a quantization process. The quantization/bitrate controller 120 scalar quantizes the frequency signals so that the magnitude of quantization noise of each quantization band becomes smaller than the masking threshold value in order to allow people to hear and not to feel in operation 300. The data quantized by the quantization/bitrate controller 120 is encoded into a hierarchical bitstream composed of a base layer and a plurality of enhancement layers by the bit packing unit 130. The base layer is a layer having the lowest bitrate. The enhancement layers have higher bitrate than the base layer has, and if the layer is enhanced, the bitrate becomes higher. Accordingly, the number of BSAC bits is counted in operation 310, and the number of available bits per layer is calculated by calculating a layer structure considering the number of bits to be used in operation 320. By counting the number of bits of audio data to be used, the number of bits to be allocated per frame are calculated. Here, encoding of an audio signal is performed in a frame unit. Controlling of bitrate indicates controlling of quantization to fit the number of bits allocated to a frame. For example, if 1000 bits are allocated to a frame, the quantization level must be determined suitable for the number of bits, and if 10000 bits are allocated to a frame, the quantization level may be relatively finely divided.

After the layer structure and the number of available bits per layer are calculated, according to the layer structure, data of from the base layer to the top layer is encoded in operation 330, and the encoded bitstream is stored as a file in operation 340.

Figure 4:
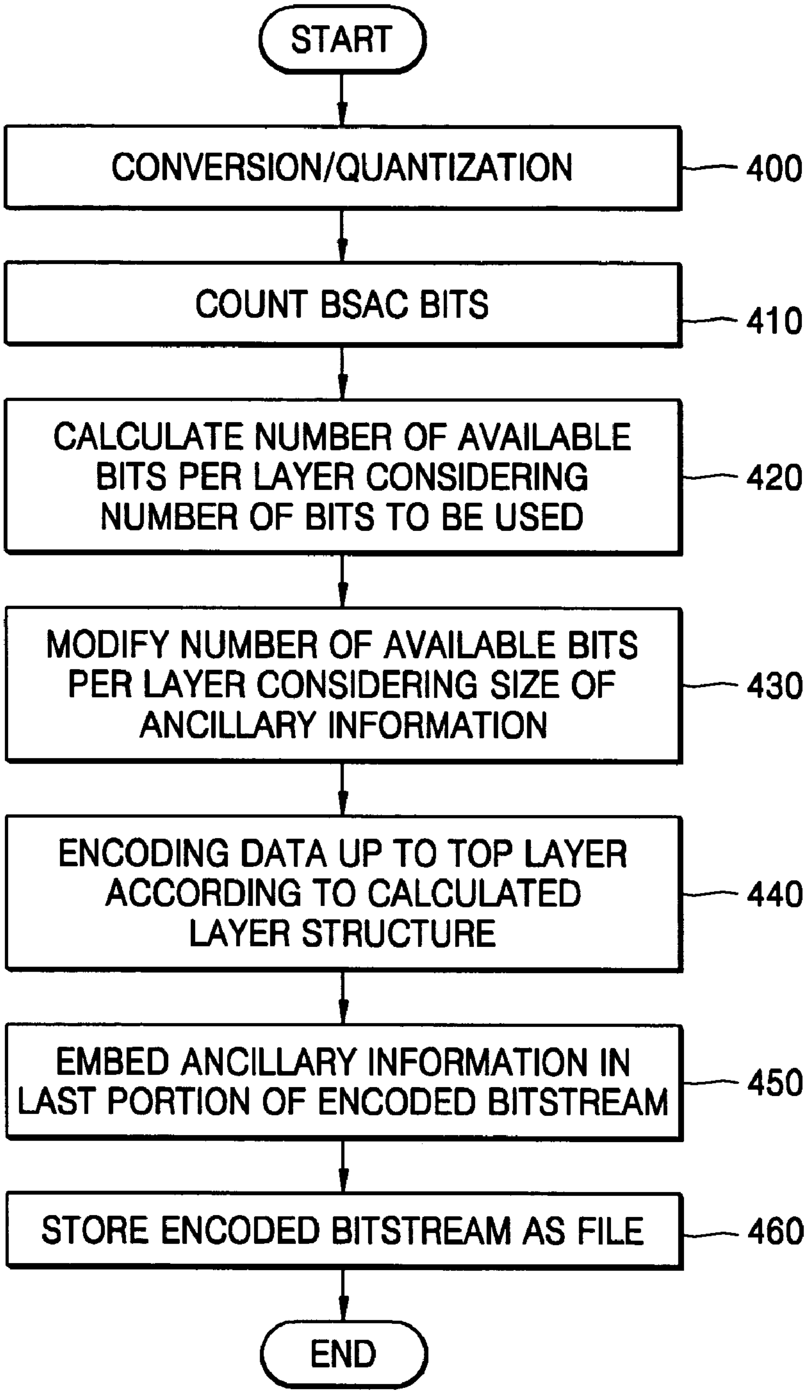
FIG. 4 is a flowchart of operations for encoding an MPEG-4 BSAC audio bitstream having ancillary information according to an embodiment of the present invention.

FIG. 4 is a flowchart of an operation of an apparatus for encoding an MPEG-4 BSAC audio bitstream having ancillary information according to an embodiment of the present invention.

Referring to FIG. 4, a conversion/quantization operation 400, a BSAC bit counting operation 410, an operation 420 for calculating the number of available bits by calculating a layer structure considering the number of bits to be used, and an operation 460 for storing an encoded bitstream as a file in are the same as the conversion/quantization in operation 300, the BSAC bit counting in operation 310, the calculating of the number of available bits by calculating a layer structure considering the number of bits to be used in operation 320, and the storing of an encoded bitstream as a file in operation 340 of FIG. 3, respectively, described above.

Therefore, a specific operation of the apparatus for encoding an MPEG-4 BSAC audio bitstream having ancillary information according to an embodiment of the present invention will now be described.

The number of bits of bitrate controlled audio data is counted by the bit counter 26 of the available bit calculator 220 in operation 410, and the number of available bits per layer is obtained by the by-layer available bit calculator 28 using the number of bits and layers to be used in operation 420. The number of available bits per layer is modified by the available bit modifier 240 by obtaining the size of the ancillary information to be embedded in operation 430. Likewise, data from a base layer to a top layer is encoded by the bit packing unit 260 according to the calculated layer structure in operation 440, and ancillary information is embedded in the last portion of the encoded bitstream in operation 450. The encoded bit stream is encoded as a file in operation 460.

The ancillary information may be information related to music tunes, for example, titles of songs, words of songs, names of composers, or names of singers, or meta data for a user such as ID3v1. Also, the ancillary information may be audio post-processing information to improve sound quality and information related to multi-channel data.

Figure 5:
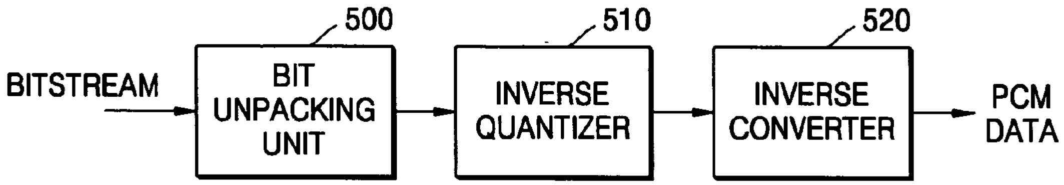
FIG. 5 is a block diagram of an apparatus for decoding an MPEG-4 BSAC audio bitstream.

FIG. 5 is a block diagram of an apparatus for decoding an MPEG-4 BSAC audio bitstream. Referring to FIG. 5, the apparatus comprises a bit unpacking unit 500, an inverse quantizer 510, and an inverse converter 520.

The bit unpacking unit 500 decodes quantized data in the order in which layers were generated in the bitstream having a layer structure. That is, the bit unpacking unit 500 analyzes the importance of bits included in the bitstream and decodes the bits of the bitstream in the order from a top layer to a base layer and in the order from the most significant bits to the least significant bits in each layer. The inverse quantizer 510 restores the decoded quantization data into a signal having an original size. The inverse converter 520 allows a user to reproduce an audio signal by converting the frequency domain audio signal to the time domain audio signal.

Figure 6:
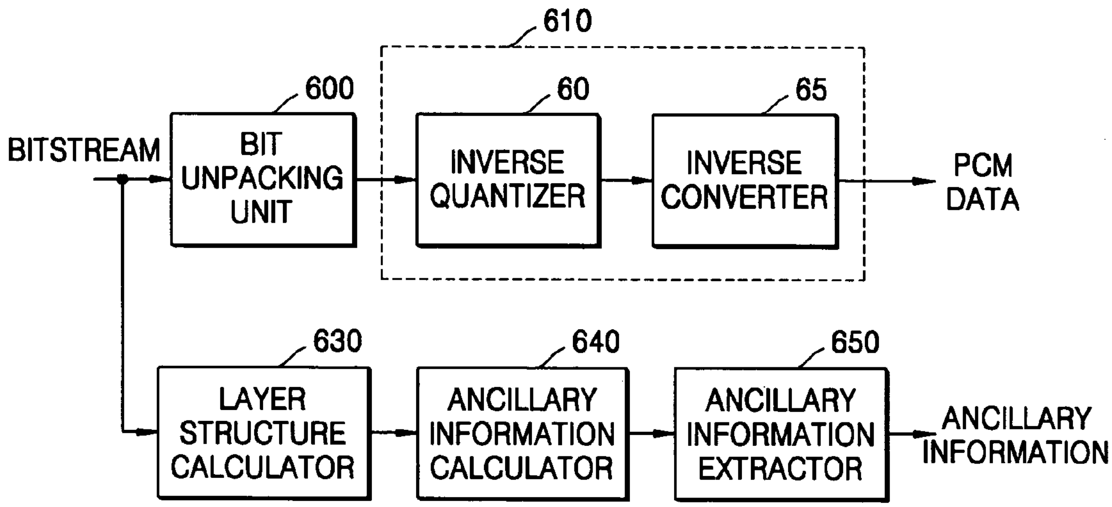
FIG. 6 is a block diagram of an apparatus for decoding an MPEG-4 BSAC audio bitstream having ancillary information according to an embodiment of the present invention.

FIG. 6 is a block diagram of an apparatus for decoding an MPEG-4 BSAC audio bitstream having ancillary information according to an embodiment of the present invention. Referring to FIG. 6, the apparatus comprises a bit unpacking unit 600, an audio decoder 610, a layer structure calculator 630, an ancillary information calculator 640, and an ancillary information extractor 650.

The bit unpacking unit 600 decodes a header of an audio bitstream. The layer structure calculator 630 calculates a layer structure of the audio bitstream by obtaining a size of a frame from the header information. The ancillary information calculator 640 obtains the size of data up to a top layer and the size of a frame from the layer structure and determines a difference between the size of the data up to the top layer and the size of the frame as the size of ancillary information. The ancillary information extractor 650 extracts the ancillary information from the audio bitstream, i.e., a number of bits corresponding to the size of the ancillary information. The audio decoder 610 decodes the audio bitstream up to the top layer according to the calculated layer structure and comprises an inverse quantizer 60 and an inverse converter 65. The inverse quantizer 60 and the inverse converter 65 have the same functions as the inverse quantizer 510 and the inverse converter 520 of FIG. 5, respectively.

Figure 7:
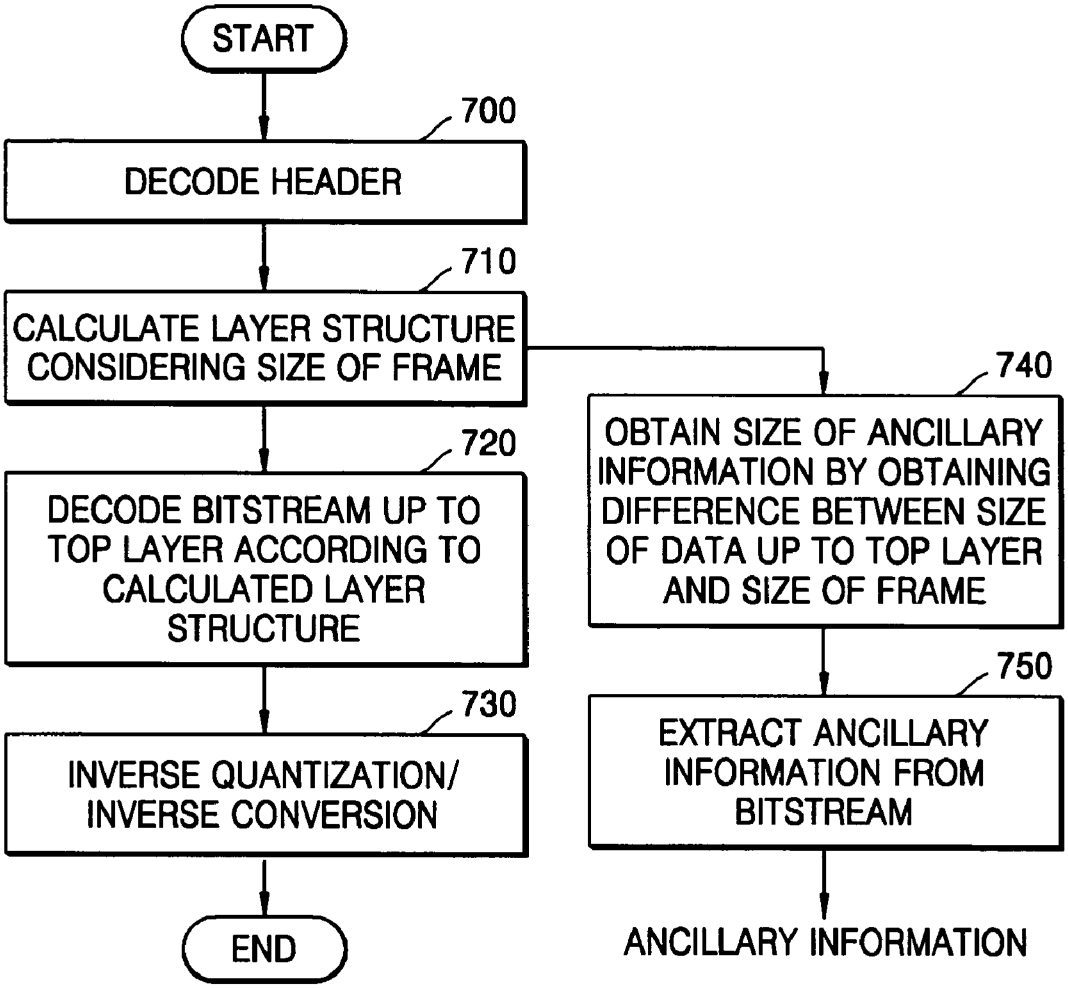
FIG. 7 is a flowchart of a method of decoding an MPEG-4 BSAC audio bitstream having ancillary information according to an embodiment of the present invention.

FIG. 7 is a flowchart of a method of decoding an MPEG-4 BSAC audio bitstream having ancillary information according to an embodiment of the present invention.

Bitstream decoding is performed in an inverse order of bitstream encoding. First, header information of a bitstream is decoded in operation 700. A layer structure of audio data required for decoding is calculated by obtaining a size of a frame from header information in operation 710.

The fact that the layer structure is calculated considering the size of the frame indicates that 100 bits each are allocated to every layer when information that the size of the frame is 1000 bits and the number of layers is 10 is received. The size of a bitstream up to a top layer and the size of a frame are obtained from the layer structure, and a difference between the size of the bitstream up to the top layer and the size of the frame is determined as the size of ancillary information in operation 740. Also, it may be judged whether ancillary information of an MPEG-4 audio is embedded after operations 700, 710, and 740 are performed. That is, if the size of a frame is larger than the size of data up to a top layer, it may be determined that the ancillary information is embedded, and if the size of a frame is not larger than the size of the data up to the top layer, it may be determined that the ancillary information is not embedded.

When obtaining the size of the ancillary information by calculating the difference between the size of the data up to the top layer and the size of the frame in operation 740, the size of the ancillary information is 50 bits when the number of bits up to the top layer is 1000, that is, 100 bits each for every layer, and the size of the received frame length information is 1050 bits. Therefore, the last 50 bits are extracted as the ancillary information.

That is, the size of the ancillary information from the audio bitstream corresponds to the size of the ancillary information in operation 750.

On the other hand, the audio data up to the top layer is decoded according to the calculated layer structure in operation 720. The decoding of the audio signal starts from the decoding of information of a base layer. After the decoding of audio data of the size allocated to the base layer is finished, a quantization value of audio data of one step higher layer is decoded. Likewise, audio data of all layers and the ancillary information may be decoded. The data quantized by the decoding process may be restored by passing through the inverse quantizer 60 and the inverse converter 65 of FIG. 6. The restored signal is generated by inverse quantizing and inverse converting the quantized data in operation 730.

Figure 8:
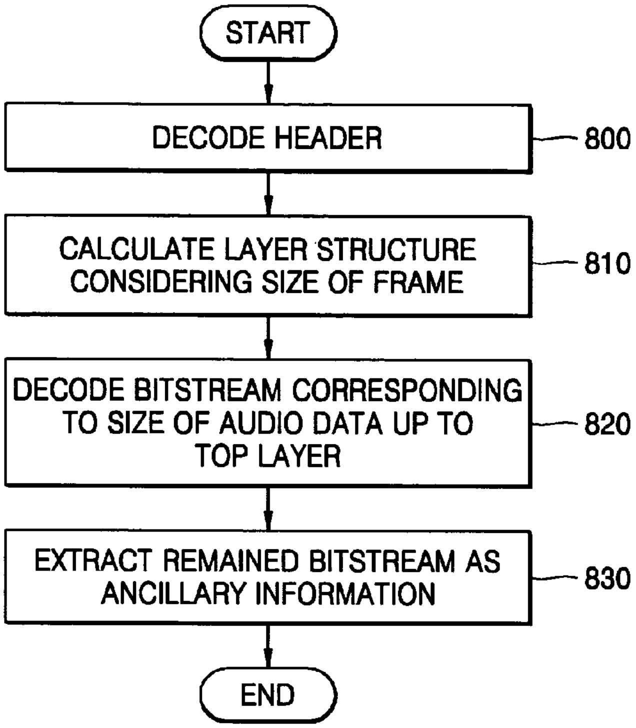
FIG. 8 is a flowchart of another method of decoding an MPEG-4 BSAC audio bitstream having ancillary information according to another embodiment of the present invention.

FIG. 8 is a flowchart of another method of decoding an MPEG-4 BSAC audio bitstream having ancillary information according to another embodiment of the present invention.

Referring to FIG. 8, header information of a bitstream is decoded in operation 800. A layer structure of the bitstream is calculated by obtaining the size of a frame from the header information in operation 810. Audio data corresponding to the size of the bitstream up to a top layer from a layer structure of the bitstream is decoded in operation 820. The remaining bitstream is extracted as the ancillary information and decoded in operation 830.

The MPEG-4 BSAC may perform fine grain scalability (FGS) using the layer structure. Information of the layer structure is defined by a BSAC syntax, and actual layer data is calculated by extracting the information in operation 700 and using the information in operation 710. A pseudo code for calculating the number of available bits per layer is as follows. The pseudo code is evenly applied to the encoder/decoder. Variable names used for the pseudo code are shown in Clause 4.5.2.6.2 of the ISO/IEC 14496-3 standard paper.

```
for (layer = 0; layer <(top__layer+slayer__size); layer++) {
 layer__si__maxlen[layer] = 0;
 for (cband = layer__start__cband[layer]; cband < layer__end__cband[layer]; cband++) {
  for (ch=0; ch <nch; ch++) {
   if (cband == 0)
    layer__si__maxlen[layer] += max__cband0__si__len;
   else
    layer__si__maxlen[layer] += max__cband__si__len[cband__si__type[ch]];
   }
 }
   for (sfb = layer__start__sfb[layer]; sfb < layer__end__sfb[layer]; sfb++)
  for (ch = 0; ch < nch; ch++)
   layer__si__maxlen[layer] += max__sfb__si__len[ch] + 5;
 }
 for (layer = slayer__size; layer <= (top__layer + slayer__size); layer++) {
 layer__bitrate = nch * ( (layer-slayer__size) * 1000 + 16000);
 layer__bit__offset[layer] = layer__bitrate * BLOCK__SIZE__SAMPLES__IN__FRAME;
 layer__bit__offset[layer] = (int)(layer__bit__offset[layer] / SAMPLING__FREQUENCY / 8 ) * 8;
  if (layer__bit__offset[layer] > frame__length*8)
   layer__bit__offset[layer] = frame__length*8;
 }
 for (layer = (top__layer + slayer__size −1); layer >= slayer__size; layer−−) {
  bit__offset = layer__bit__offset[layer+1] − layer__si__maxlen[layer]
  if ( bit__offset < layer__bit__offset[layer] )
   layer__bit__offset[layer] = bit__offset
 }
 for (layer = slayer__size − 1; slayer__size >= 0; slayer−−)
  layer__bit__offset[layer] = layer__bit__offset[layer+1] − layer__si__maxlen[layer];
 overflow__size = (header__length + 7) * 8 − layer__bit__offset[0];
 layer__bit__offset[0] = (header__length + 7) * 8;
 if (overflow__size > 0) {
  for ( layer = (top__layer+slayer__size−1); layer >= slayer__size; layer−−) {
   layer__bit__size = layer__bit__offset[layer+1] − layer__bit__offset[layer];
   layer__bit__size −= layer__si__maxlen[layer];
   if (layer__bit__size >= overflow__size) {
    layer__bit__size = overflow__size;
    overflow__size = 0;
   }
   else
    overflow__size = overflow__size − layer__bit__size;
   for (m=1; m<=layer; m++)
    layer__bit__offset[m] += layer__bit__size;
   if (overflow__size<=0)
    break;
  }
 }
 else {
  underflow__size = −overflow__size;
  for (m=1; m < slayer__size; m++) {
  layer__bit__offset[m] = layer__bit__offset[m−1] + layer__si__maxlen[m−1];
  layer__bit__offset[m] += underflow__size / slayer__size;
  if (layer <= (underflow__size%slayer__size);
   layer__bit__offset[m] += 1;
  }
}
for (layer=0; layer <(top__layer+slayer__size); layer++)
 available__len[layer] = layer__bit__offset[layer+1] − layer__bit__offset[layer];
```

As shown above, layer_bit_offset corresponding to the number of bits usable per layer is obtained, and audio data in layers is decoded according to layer_bit_offset.

Figure 9:
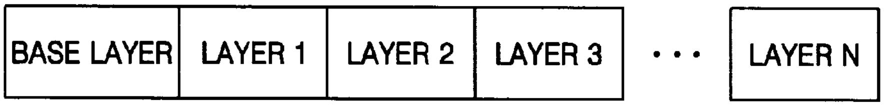
FIG. 9 is a configuration of a BSAC bitstream.
Figure 10:
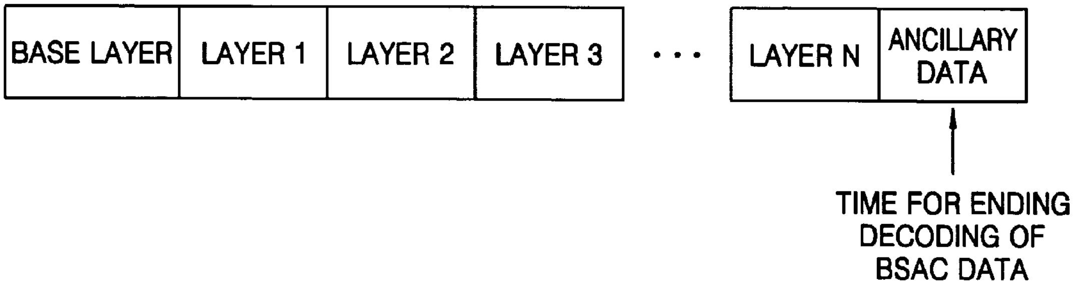
FIG. 10 shows a position where ancillary information is embedded in a BSAC bitstream.
Figure 11:
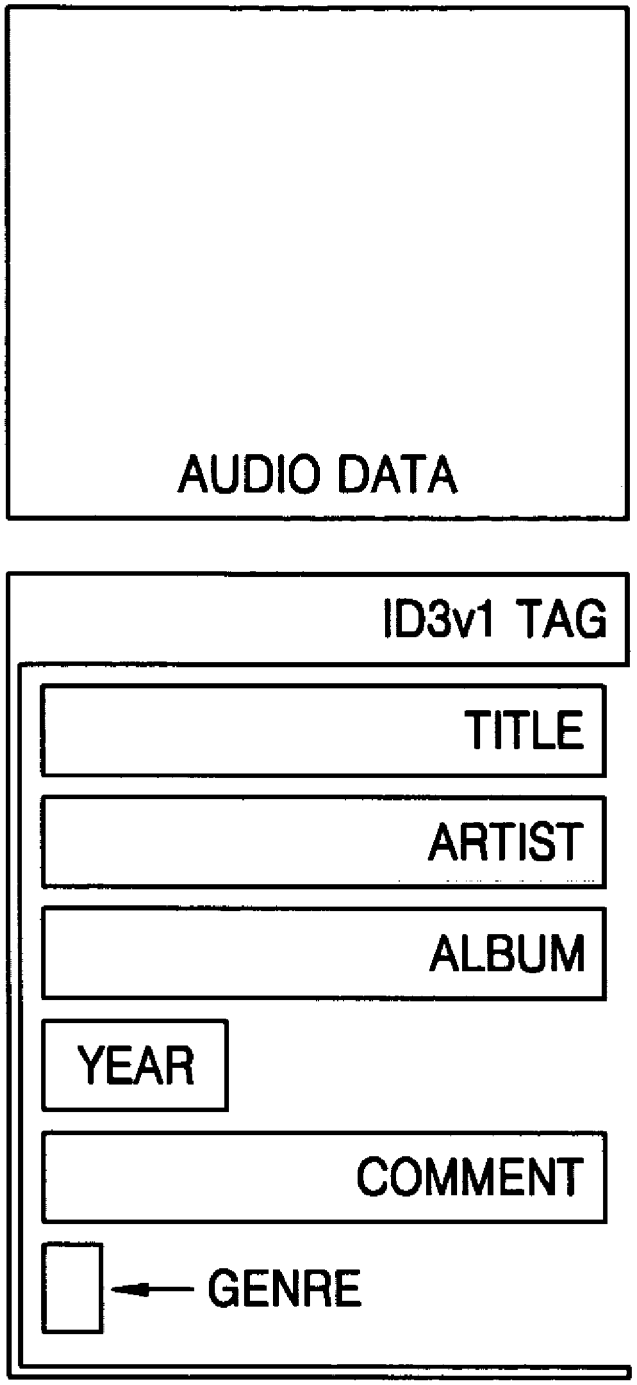
FIG. 11 shows a bitstream structure of ID3v1.

FIG. 9 is a configuration of a BSAC bitstream. FIG. 10 shows a position where ancillary information is embedded in a BSAC bitstream.

The present invention is useable as follows. First, when audio data is compressed at a rate of 48 Kbps using an MPEG-4 BSAC audio encoder, the present invention may be used in a case of encoding the audio data so that the audio data covers only frequency subbands of 0-7 KHz, generating a bitstream using spectral band replication (SBR) for information of 7-16 KHz, embedding the SBR bitstream as ancillary information, and storing a bitstream embedding the SBR bitstream as a file. In this case, 0-16 KHz sound data may be decoded in a decoder that recognizes the SBR ancillary information, and good quality may be provided in a low bitrate. However, since it is impossible to extract the SBR ancillary information in a conventional MPEG-4 BSAC decoder, a sound having a 0-7 KHz band may be heard, and the SBR data is regarded as dummy data.

Second, when audio data having a rate of 128 Kbps is compressed using an MPEG-4 BSAC audio encoder, words of songs may be embedded using the present invention. That is, the words of songs may be output without additional temporal information by arranging the words and the temporal information of the audio data and encoding the words information corresponding to each time as ancillary information in an audio bitstream. In a conventional MPEG-4 BSAC decoder, the words information cannot be received, and only a sound may be decoded.

The present invention may also be embodied as computer readable codes on a computer readable recording medium. The computer readable recording medium may be any data storage device that stores data which may be thereafter read by a computer system. Examples of the computer readable recording medium include read-only memory (ROM), random-access memory (RAM), CD-ROMs, magnetic tapes, floppy disks, optical data storage devices.

As described above, in a method and apparatus for encoding/decoding an MPEG-4 BSAC audio bitstream embedding ancillary information according to embodiments of the present invention, in a case of providing a service using BSAC by embedding ancillary information, a distinctive service may be provided by providing additional data capable of improving meta data or sound quality of audio contents.

Also, since the method and apparatus allow insertion of ancillary information, which is not possible using the MPEG-4 BSAC syntax, when audio data is reproduced, information of media may be additionally provided to a user by embedding audio meta data.

Also, high sound quality at a low bitrate may be provided by embedding ancillary information for audio post-processing.

Also, since the method and apparatus allow a conventional decoder to be used even though ancillary information is embedded, the conventional decoder may be compatibly used. Furthermore, by providing ancillary information, competitiveness of decoders capable of handling the ancillary information as compared with conventional decoders is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encoding an MPEG-4 BSAC audio bitstream having ancillary information and encoded quantized audio data, the method comprising:

converting a time domain audio signal to a frequency domain audio signal and quantizing the audio signal into quantized audio data using a psychoacoustic model;

counting a number of bits of bitrate controlled audio data;

obtaining a number of available bits per layer of the encoded quantized audio data using a number of the counted bits and a number of layers in the audio bitstream;

modifying the number of available bits of the encoded quantized audio data per layer by obtaining a size of the ancillary information and by reducing the obtained number of available bits per layer as many as the size of the ancillary information;

encoding the quantized audio data in units of layers according to the modified number of available bits from a base layer to a top layer, wherein each layer has a different bit rate and the bit rate increases from base layer to top layer; and embedding the ancillary information in the audio bitstream, wherein ancillary information is embedded in the last portion adjacent to an N-th enhancement layer in the MPEG-4 BSAC audio bitstream comprising the base layer and N number of enhancement layers, where N is equal to or greater than 1.

2. The method of claim 1, wherein the ancillary information is information related to sound quality improvement.

3. The method of claim 1, wherein the ancillary information is information related to music tunes.

4. The method of claim 1, wherein the ancillary information is information related to multi-channel data.

5. The method of claim 1, wherein the embedded ancillary information is at least one of meta data, audio post-processing to improve sound quality, information related to multi-channel data, and information related to music tunes including titles of songs.

6. An apparatus for encoding an MPEG-4 BSAC audio bitstream having ancillary information and encoded quantized audio data, the apparatus comprising:

a quantization processor to convert a time domain audio signal in to a frequency domain audio signal and to quantize the frequency domain audio signal using a psychoacoustic model;

an available bit calculator to obtain a number of available bits for the encoded quantized audio data per layer using a number of bits of the encoded quantized audio data and a number of layers of the encoded quantized audio data;

an available bit modifier to modify the number of available bits of the encoded quantized audio data per layer calculated by the available bit calculator by obtaining a size of the ancillary information and by reducing the obtained number of available bits per layer as many as the size of the ancillary information; and a bit packing unit to encode the quantized audio data according to the number of available bits per layer modified by the available bit modifier and the embedding ancillary information in the audio bitstream from a base layer to a top layer, wherein each layer has a different bit rate and the bit rate increases from base layer to top layer, wherein ancillary information is embedded in the last portion adjacent to an N-th enhancement layer in the MPEG-4 BSAC audio bitstream comprising the base layer and N number of enhancement layers, where N is equal to or greater than 1.

7. The apparatus of claim 6, wherein the available bit calculator comprises:

a bit counter to count a number of bits of bitrate controlled audio data; and a by-layer available bit calculator to obtain the number of available bits of the encoded quantized audio data per layer using the number of bits counted by the bit counter and a predetermined number of layers of the bitstream.

8. A method of decoding an MPEG-4 BSAC audio bitstream having ancillary information and encoded quantized audio data, the MPEG-4 BSAC audio bitstream being generated by obtaining a number of available bits per layer, modifying the number of available bits per layer by reducing the obtained number of available bits per layer as many as the size of the ancillary information and encoding audio data in units of layers according to the modified number of available bits, the method comprising:

decoding a header of the audio bitstream;

calculating a layer structure of the audio bitstream by obtaining a size of a frame from the header information;

obtaining a size of the encoded quantized audio data up to a top layer and the size of the frame from the layer structure and determining a difference between the size of the encoded quantized audio data up to the top layer and the size of the frame as a size of the ancillary information;

extracting the ancillary information from the audio bitstream according to the size of the ancillary information; and decoding the encoded quantized audio data up to the top layer according to the calculated layer structure from a base layer to the top layer, wherein each layer has a different bit rate and the bit rate increases from base layer to top layer, wherein ancillary information is embedded in the last portion adjacent to an N-th enhancement layer in the MPEG-4 BSAC audio bitstream comprising the base layer and N number of enhancement layers, where N is equal to or greater than 1.

9. The method of claim 8, wherein the extracted ancillary information is information related to sound quality improvement.

10. The method of claim 8, wherein the extracted ancillary information is meta data of audio for an audio data user.

11. A method of decoding an MPEG-4 BSAC audio bitstream having ancillary information and encoded quantized audio data, the MPEG-4 BSAC audio bitstream being generated by obtaining a number of available bits per layer, modifying the number of available bits per layer by reducing the obtained number of available bits per layer as many as the size of the ancillary information and encoding audio data in units of layers according to the modified number of available bits, the method comprising:

decoding a header of the audio bitstream;

calculating a layer structure of the audio bitstream by obtaining a size of a frame from the header information;

decoding the encoded quantized audio data corresponding to a size of encoded quantized audio data up to a top layer from the layer structure of the bitstream from a base layer to the top layer, wherein each layer has a different bit rate and the bit rate increases from base layer to top layer; and extracting a remaining bitstream as the ancillary information and decoding the ancillary information, wherein ancillary information is embedded in the last portion adjacent to an N-th enhancement layer in the MPEG-4 BSAC audio bitstream comprising the base layer and N number of enhancement layers, where N is equal to or greater than 1.

12. The method of claim 11, wherein the extracted ancillary information is information related to sound quality improvement.

13. The method of claim 11, wherein the extracted ancillary information is meta data of audio for an audio data user.

14. A method of discriminating whether ancillary information is embedded in quantized audio data encoded with MPEG-4 BSAC audio data, the MPEG-4 BSAC audio bitstream being generated by obtaining a number of available bits per layer, modifying the number of available bits per layer by reducing the obtained number of available bits per layer as many as the size of the ancillary information and encoding audio data in units of layers according to the modified number of available bits, the method comprising:

decoding a header of a bitstream, the bitstream including the encoded quantized audio data;

calculating a layer structure of the bitstream by obtaining a size of a frame from the header information from a base layer to a top layer, wherein each layer has a different bit rate and the bit rate increases from base layer to top layer;

obtaining a size of the encoded quantized audio data up to the top layer and the size of the frame from the layer structure and discriminating whether ancillary information exists using a difference between the size of the encoded quantized audio data up to the top layer and the size of the frame; and outputting an indication of whether ancillary information is embedded in the encoded quantized audio data based on the discriminating, wherein ancillary information is embedded in the last portion adjacent to an N-th enhancement layer in the MPEG-4 BSAC audio bitstream comprising the base layer and N number of enhancement layers, where N is equal to or greater than 1.

15. An apparatus for decoding an MPEG-4 BSAC audio bitstream having ancillary information and encoded quantized audio data, the MPEG-4 BSAC audio bitstream being generated by obtaining a number of available bits per layer, modifying the number of available bits per layer by reducing the obtained number of available bits per layer as many as the size of the ancillary information and encoding audio data in units of layers according to the modified number of available bits, the apparatus comprising:

a bit unpacking unit to decode a header of the audio bitstream;

a layer structure calculator to calculate a layer structure of the audio bitstream by obtaining a size of a frame from header information from a base layer to a top layer;

an ancillary information calculator to obtain a size of the encoded quantized audio data up to the top layer and the size of the frame from the layer structure and to determine a difference between the size of the encoded quantized data up to the top layer and the size of the frame as a size of the ancillary information;

an ancillary information extractor to extract the ancillary information from the audio bitstream according to the size of the ancillary information; and an audio decoder to decode the encoded quantized audio data up to the top layer from the base layer according to the calculated layer structure, wherein each layer has a different bit rate and the bit rate increases from base layer to top layer, wherein ancillary information is embedded in the last portion adjacent to an N-th enhancement layer in the MPEG-4 BSAC audio bitstream comprising the base layer and N number of enhancement layers, where N is equal to or greater than 1.

16. A non-transitory computer readable medium having recorded thereon a computer readable program for performing a method of encoding an MPEG-4 BSAC audio bitstream having ancillary information and encoded quantized audio data, the computer readable medium comprising instructions for enabling a computer to:

convert a time domain audio signal to a frequency domain audio signal and quantize the audio signal into quantized audio data using a psychoacoustic model;

count a number of bits of bitrate controlled audio data;

obtain a number of available bits per layer of the encoded quantized audio data using a number of the counted bits and a number of layers in the audio bitstream;

modify the number of available bits of the encoded quantized audio data per layer by obtaining a size of the ancillary information and by reducing the obtained number of available bits per layer as many as the size of the ancillary information;

encode the quantized audio data in units of layers according to the modified number of available bits from a base layer to a top layer, wherein each layer has a different bit rate and the bit rate increases from base layer to top layer; and embed the ancillary information in the audio bitstream, wherein ancillary information is embedded in the last portion adjacent to an N-th enhancement layer in the MPEG-4 BSAC audio bitstream comprising the base layer and N number of enhancement layers, where N is equal to or greater than 1.

17. A non-transitory computer readable medium having recorded thereon a computer readable program for performing the a method of decoding an MPEG-4 BSAC audio bitstream having ancillary information and encoded quantized audio data, the MPEG-4 BSAC audio bitstream being generated by obtaining a number of available bits per layer, modifying the number of available bits per layer by reducing the obtained number of available bits per layer as many as the size of the ancillary information and encoding audio data in units of layers according to the modified number of available bits, the computer readable medium comprising instructions for enabling a computer to:

decode a header of the audio bitstream;

calculate a layer structure of the audio bitstream by obtaining a size of a frame from the header information;

obtain a size of the encoded quantized audio data up to a top layer from a base layer and the size of the frame from the layer structure and determine a difference between the size of the data up to the top layer and the size of the frame as a size of the ancillary information;

extract the ancillary information from the audio bitstream according to the size of the ancillary information; and decode the encoded quantized audio data up to the top layer from the base layer according to the calculated layer structure, wherein each layer has a different bit rate and the bit rate increases from base layer to top layer, and wherein ancillary information is embedded in the last portion adjacent to an N-th enhancement layer in the MPEG-4 BSAC audio bitstream comprising the base layer and N number of enhancement layers, where N is equal to or greater than 1.

* * * * *

UNITED STATES PATENT AND TRADEMARK OFFICE

CERTIFICATE OF CORRECTION

PATENT NO. : 7,974,840 B2
APPLICATION NO. : 10/996062
DATED : July 5, 2011
INVENTOR(S) : Junghoe Kim et al.

It is certified that error appears in the above-identified patent and that said Letters Patent is hereby corrected as shown below:

Column 15, Line 13 (Approx.), In Claim 17, delete “the a” and insert -- the --, therefor.

Signed and Sealed this
Fourteenth Day of February, 2012

David J. Kappos
*Director of the United States Patent and Trademark Office*